US008987616B2

(12) United States Patent
Ngoh et al.

(10) Patent No.: US 8,987,616 B2
(45) Date of Patent: Mar. 24, 2015

(54) WEIGHT SCALE FOR A PATIENT LIFT SYSTEM, A CONTROL SYSTEM FOR THE WEIGHT SCALE, AND A METHOD FOR WEIGHING A PATIENT SUPPORTED ON THE WEIGHT SCALE

(75) Inventors: Liew Chooi Ngoh, Singapore (SG); Wen Yuanqiang, Singapore (SG)

(73) Assignee: Liko Research & Development AB, Lulea (SE)

( * ) Notice: Subject to any disclaimer, the term of this patent is extended or adjusted under 35 U.S.C. 154(b) by 254 days.

(21) Appl. No.: 13/488,963

(22) Filed: Jun. 5, 2012

(65) Prior Publication Data

US 2013/0319775 A1    Dec. 5, 2013

(51) Int. Cl.
*G01G 19/52*    (2006.01)
*B66C 1/40*    (2006.01)
*G01G 21/00*    (2006.01)
*A61G 7/10*    (2006.01)
*G01G 19/44*    (2006.01)

(52) U.S. Cl.
CPC ............ *A61G 7/1017* (2013.01); *A61G 7/1067* (2013.01); *G01G 19/52* (2013.01); *G01G 19/445* (2013.01)
USPC ................................ 177/144; 177/245; 5/600

(58) Field of Classification Search
USPC ............. 177/25.13, 144, 245; 5/600, 607
See application file for complete search history.

(56) References Cited

U.S. PATENT DOCUMENTS

| 3,322,222 | A | * | 5/1967 | Baur .......................... 177/210 R |
| 3,722,611 | A | * | 3/1973 | Tirkkonen ..................... 177/144 |
| 4,658,921 | A | * | 4/1987 | Karpa .......................... 177/50 |
| 4,691,792 | A | * | 9/1987 | Shintani ........................ 177/1 |
| 4,869,266 | A | * | 9/1989 | Taylor et al. .................. 600/587 |
| 5,209,313 | A | * | 5/1993 | Brodrick et al. .............. 177/139 |
| 5,646,376 | A | * | 7/1997 | Kroll et al. .................... 177/211 |
| 5,737,781 | A | * | 4/1998 | Votel ........................... 5/81.1 HS |
| 5,823,278 | A | * | 10/1998 | Geringer ....................... 177/144 |
| 5,831,221 | A | * | 11/1998 | Geringer et al. .............. 177/144 |
| 5,892,180 | A | * | 4/1999 | Carey ........................... 177/144 |
| 5,906,016 | A | * | 5/1999 | Ferrand et al. ................. 5/600 |
| 6,002,090 | A | * | 12/1999 | Johnson et al. ............... 177/136 |

(Continued)

FOREIGN PATENT DOCUMENTS

| DE | 102009011272 A1 | 9/2010 |
| DE | 102010014153 A1 | 10/2011 |
| WO | WO-03079953 A2 | 10/2003 |

OTHER PUBLICATIONS

International Search Report dated Sep. 26, 2014 for International Application No. PCT/IB2013/001731.

*Primary Examiner* — Randy W Gibson
(74) *Attorney, Agent, or Firm* — Schiff Hardin LLP

(57) ABSTRACT

A weight scale for a patient lift system includes a frame assembly. A plurality of force sensors are coupled to the frame assembly. Each of the plurality of force sensors is configured to generate a signal indicative of a measured weight force. A foot rest panel is coupled to the frame assembly. The foot rest panel is configured to support a patient. An angle sensor is operatively coupled to the frame assembly. The angle sensor is configured to generate a signal indicative of an angle of the frame assembly with respect to a horizontal reference plane. A controller is coupled in signal communication with each force sensor and the angle sensor. The controller includes one or more processors configured to receive signals from each force sensor and the angle sensor to determine an actual weight force of the patient.

34 Claims, 7 Drawing Sheets

(56) References Cited

U.S. PATENT DOCUMENTS

| | | | |
|---|---|---|---|
| 6,329,612 B1* | 12/2001 | von Schroeter | 177/144 |
| 6,639,157 B2* | 10/2003 | Sternberg et al. | 177/144 |
| 6,806,430 B2* | 10/2004 | Downing | 177/144 |
| 6,924,441 B1* | 8/2005 | Mobley et al. | 177/144 |
| 7,176,391 B2* | 2/2007 | Metz et al. | 177/144 |
| 7,906,737 B2* | 3/2011 | Freydank et al. | 177/25.13 |
| 2002/0023785 A1* | 2/2002 | Sternberg et al. | 177/144 |
| 2004/0221388 A1* | 11/2004 | Votel | 5/81.1 HS |
| 2004/0238230 A1* | 12/2004 | Petrotto | 177/144 |
| 2005/0097670 A1* | 5/2005 | Hawk et al. | 5/84.1 |
| 2009/0143703 A1* | 6/2009 | Dixon et al. | 600/587 |
| 2012/0038484 A1* | 2/2012 | Dixon et al. | 340/666 |

\* cited by examiner

WEIGHT SCALE FOR A PATIENT LIFT SYSTEM, A CONTROL SYSTEM FOR THE WEIGHT SCALE, AND A METHOD FOR WEIGHING A PATIENT SUPPORTED ON THE WEIGHT SCALE

BACKGROUND

The subject matter disclosed herein relates generally to a weight scale for a patient lift system and, more particularly, to a weight scale having a control system for accurately weighing a patient using the weight scale.

Many conventional weight scales for patient lift systems include a patient sling assembly in which the patient to be lifted is secured. In order to weigh the patient, the sling assembly is suspended from a sling attachment bar and the patient is lifted entirely off of the support surface, such as the hospital floor, while secured within the sling assembly. The weight of the suspended patient can then be measured using a lift scale coupled to the sling attachment bar.

SUMMARY

In one aspect, a weight scale for a patient lift system includes a frame assembly. A plurality of force sensors are coupled to the frame assembly. Each force sensor of the plurality of force sensors is configured to generate a signal indicative of a measured weight force. A foot rest panel is coupled to the frame assembly. The foot rest panel is configured to support a patient. An angle sensor is operatively coupled to the frame assembly. The angle sensor is configured to generate a signal indicative of an angle of the frame assembly with respect to a horizontal reference plane. A controller is coupled in signal communication with each force sensor and the angle sensor. The controller includes one or more processors configured to receive signals from each force sensor and the angle sensor to determine an actual weight force of the patient.

In another aspect, a control system for a patient lift system is provided. The patient lift system includes a frame assembly and a foot rest panel coupled to the frame assembly. The foot rest panel is configured to support a patient. The patient lift system also includes a weight scale having a plurality of force sensors coupled to the frame assembly and an angle sensor operatively coupled to the frame assembly. The control system includes a controller coupled in signal communication with each force sensor of a plurality of force sensors and the angle sensor. The controller includes one or more processors configured to receive signals from each force sensor and the angle sensor to determine an actual weight force of the patient and output weight information including the actual weight force to a display.

In another aspect, a method for weighing a patient supported on a patient lift system is provided. A controller includes one or more processors operable to execute computer-executable instructions. The method includes receiving, by the one or more processors, force vector data from a plurality of force sensors operatively coupled to a frame assembly of the patient lift system; receiving, by the one or more processors, angle information from an angle sensor operatively coupled to the frame assembly; compensating, by the one or more processors, for the force vector data based on the angle information; determining, by the one or more processors, an actual weight force of the patient; and displaying the actual weight force of the patient on a display coupled in signal communication with the controller.

In yet another aspect, a non-transitory computer-readable medium includes computer-executable instructions stored thereon for execution by one or more processors to perform a method for weighing a patient supported on a patient lift system weight scale. The method includes receiving from a plurality of force sensors force vector data; receiving, from an angle sensor operatively coupled to a frame assembly of the patient lift system, information indicative of an angle of the frame assembly with respect to a horizontal reference plane; compensating for the force vector data based on the information; and determining an actual weight force of the patient.

In yet another aspect, a weight scale for a patient lift system is provided. The patient lift system includes a base frame and a foot rest panel coupled to the base frame. The foot rest panel is configured to support a patient. The weight scale includes a plurality of force sensors coupled to the base frame. Each force sensor of the plurality of force sensors is configured to generate a signal indicative of a measured weight force. An angle sensor is operatively coupled to the base frame. The angle sensor is configured to generate a signal indicative of an angle of the base frame with respect to a horizontal reference plane. A controller is coupled in signal communication with each force sensor and the angle sensor. The controller includes one or more processors configured to receive signals from each force sensor and the angle sensor to determine an actual weight force of the patient.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding element reference numbers indicate corresponding parts or elements throughout the drawings.

DETAILED DESCRIPTION

The embodiments described herein relate to a weight scale for a patient lift system configured to accurately determine an actual weight force, g, of a patient supported on the weight scale. In one embodiment, a control system for the weight scale includes a controller having one or more processors that are configured to determine a weight of the patient lift system and the actual weight force of the patient based on one or more of the following: force vector data received from a plurality of force sensors operatively coupled to the frame assembly of the patient lift system, associated weighing factors for each of the force sensors, a gravity factor determined based at least in part on a latitude and an altitude at a destination location of the patient lift system, a foot rest panel mounting offset with respect to the frame assembly, and angle information received from an angle sensor operatively coupled to the frame assembly.

In the following description, the embodiments are described in relation to a patient lift system utilized to lift, transport, and weigh a patient; however, the described patient lift system is not limited to use with a patient but, rather, may be suitable for use in certain embodiments with any user, such as a person or an animal, or an object.

Figure 2:
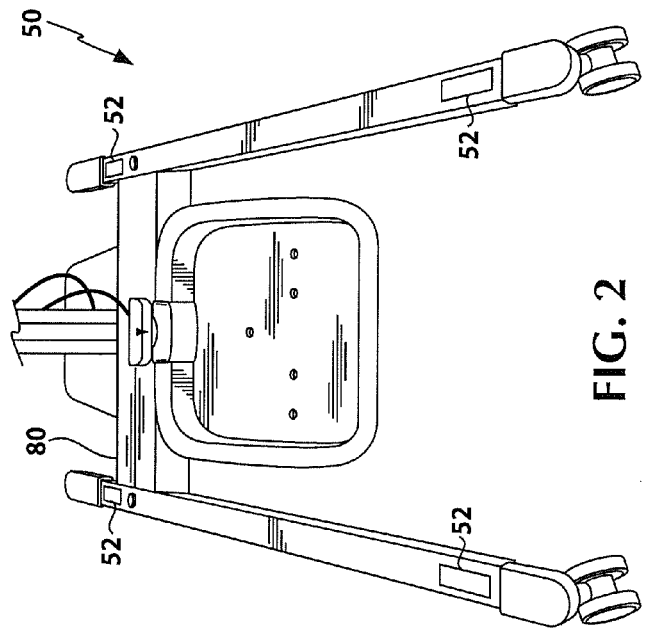
FIG. 2 is a perspective view of a base structure of the patient lift system shown in FIG. 1.
Figure 2A:
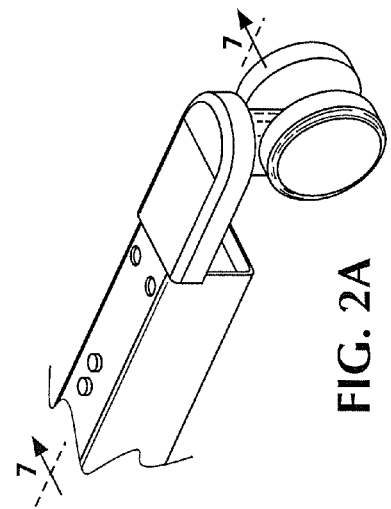
FIG. 2A is a perspective view of a portion of the base structure shown in FIG. 2.
Figure 1:
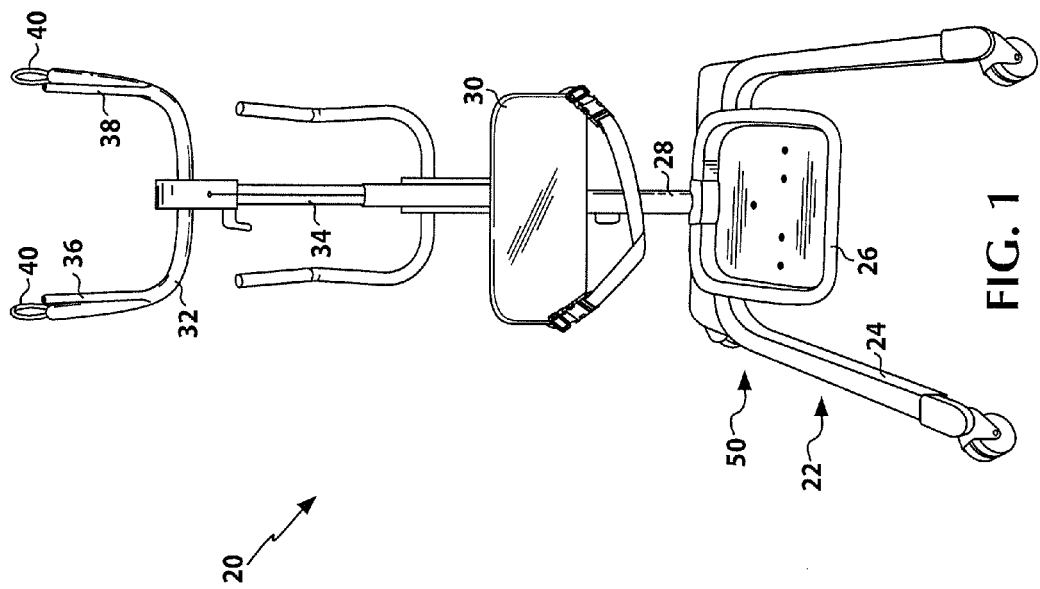
FIG. 1 is a perspective view of an exemplary patient lift system.

FIG. 1 shows an exemplary embodiment of a patient lift system 20. Patient lift system 20 includes a frame assembly 22, generally having a U-shaped base frame 24. A foot rest panel 26, configured to support a patient, is coupled to and supported by base frame 24, and a post 28 extends from frame assembly 22. As shown in FIG. 1, a knee support 30 is coupled to a lower portion of post 28. In certain embodiments, a location of knee support 30 with respect to post 28 is adjustable to accommodate patients of varying height, as well as adjustable in a direction towards or a direction away from post 28. A swinging arm 32 is coupled to an upper portion of post 28. Swinging arm 32 is movable upwards and downwards in a vertical plane. In certain embodiments, an electric or hydraulic driving means 34 is operatively coupled to swinging arm 32 to facilitate movement of swinging arm 32 into a desirable position. Opposing arms 36 and 38 extend from opposing terminal or free ends of swinging arm 32. Arm 36 extends generally parallel with arm 38 with a suitable distance between arm 36 and arm 38 to accommodate a width of the patient being lifted.

Referring further to FIG. 1, a hook 40 is coupled to each arm 36 and 38. Hooks 40 are configured to retain a lifting sling or belt (not shown) suspended between arm 36 and arm 38. During use, the belt is positioned around a torso of the patient to support the patient. Such lifting slings or belts are well known in the art and will not be described in detail herein. For example, when a patient is lifted from a sitting position in a chair, the belt is positioned about the patient's body and a first strap is then coupled to a first hook 40 in a suitable manner so that the first strap is stretched. A second strap is fastened to the other hook 40. Lifting bands are then coupled in the same way. Once it is confirmed that all bands and straps are similarly stretched, the lifting action is accomplished by the lifting bands. With the straps coupled to respective hooks 40, a tension in each strap will be maintained during the lifting operation.

Figure 3:
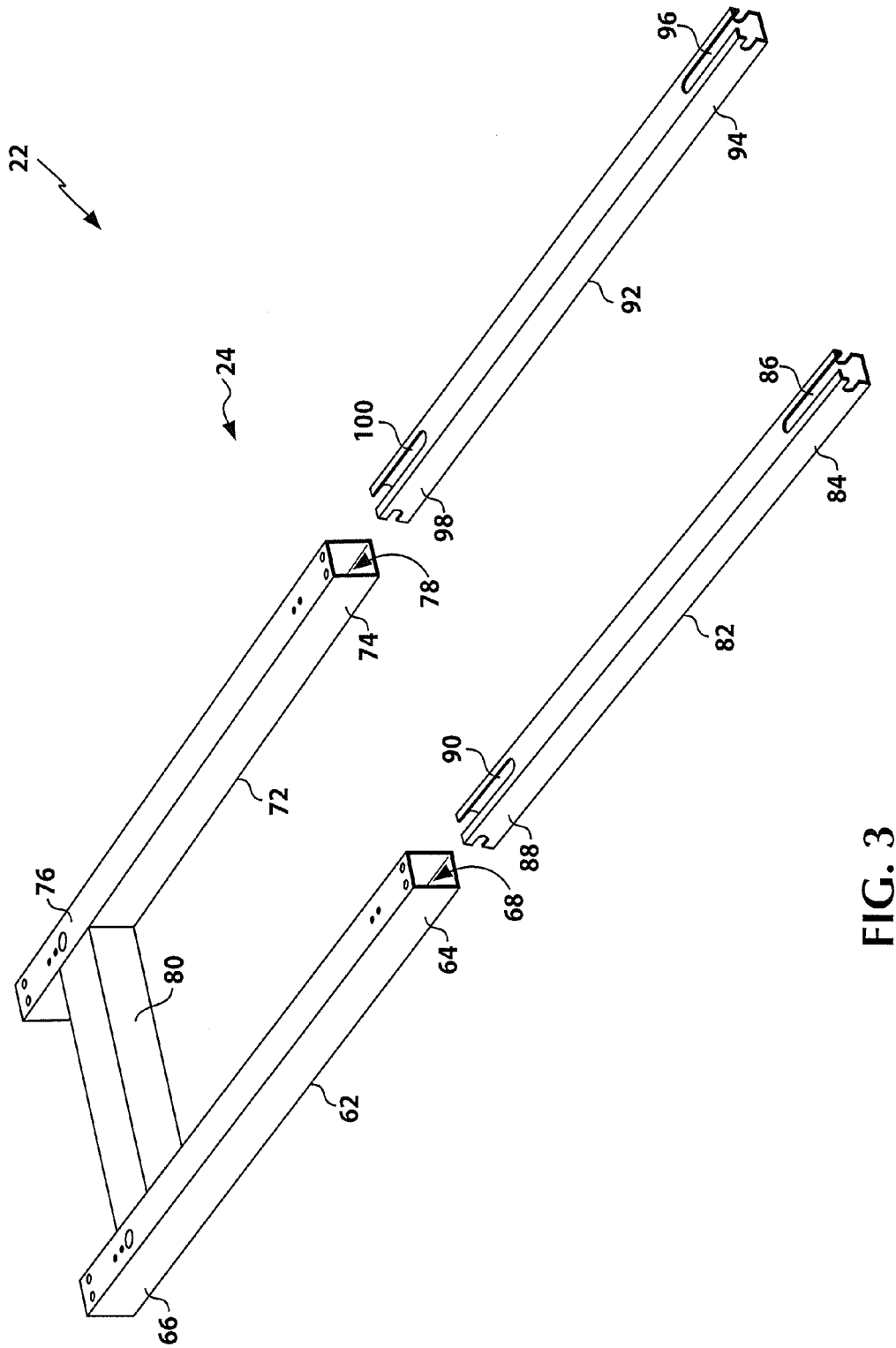
FIG. 3 is an exploded perspective view of a portion of the frame assembly of the patient lift system shown in FIG. 1.
Figure 4:
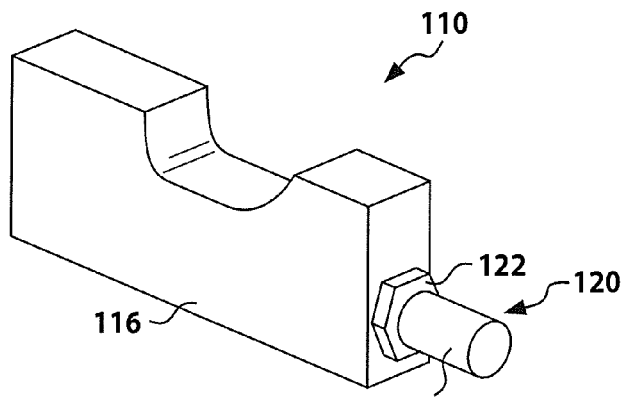
FIG. 4 is a perspective view of an exemplary load cell suitable for a weight scale of the patient lift system shown in FIG. 1.
Figure 5:
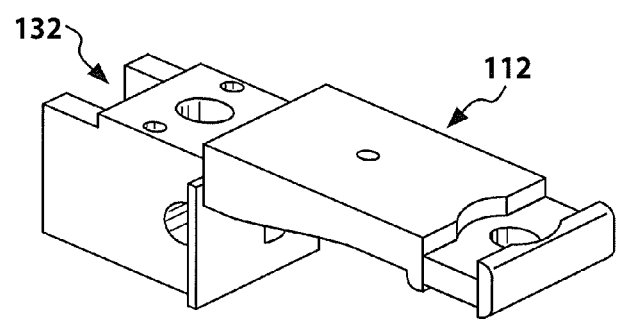
FIG. 5 is a perspective view of an exemplary castor support suitable for a weight scale of the patient lift system shown in FIG. 1.

Referring to FIGS. 2-8, a weight scale 50 is operatively coupled to patient lift system 20. Weight scale 50 allows a caregiver to weigh a patient while the patient is standing on and supported by foot rest panel 26 or base frame 24. A plurality of force sensors 52 are coupled to frame assembly 22, as shown in broken lines in FIG. 2. In one embodiment, each force sensor 52 includes a load cell, such as shown in FIG. 4, and a castor support, as shown in FIG. 5, operatively coupled to the load cell, as described in greater detail below. In addition or alternatively, various force sensors can be used with weight scale 50 including, without limitation, mechanical or electrical scales such as strain gauges, transducers, and springs. Each force sensor 52 is configured to generate a signal indicative of a measured weight force as described herein.

Figure 8:
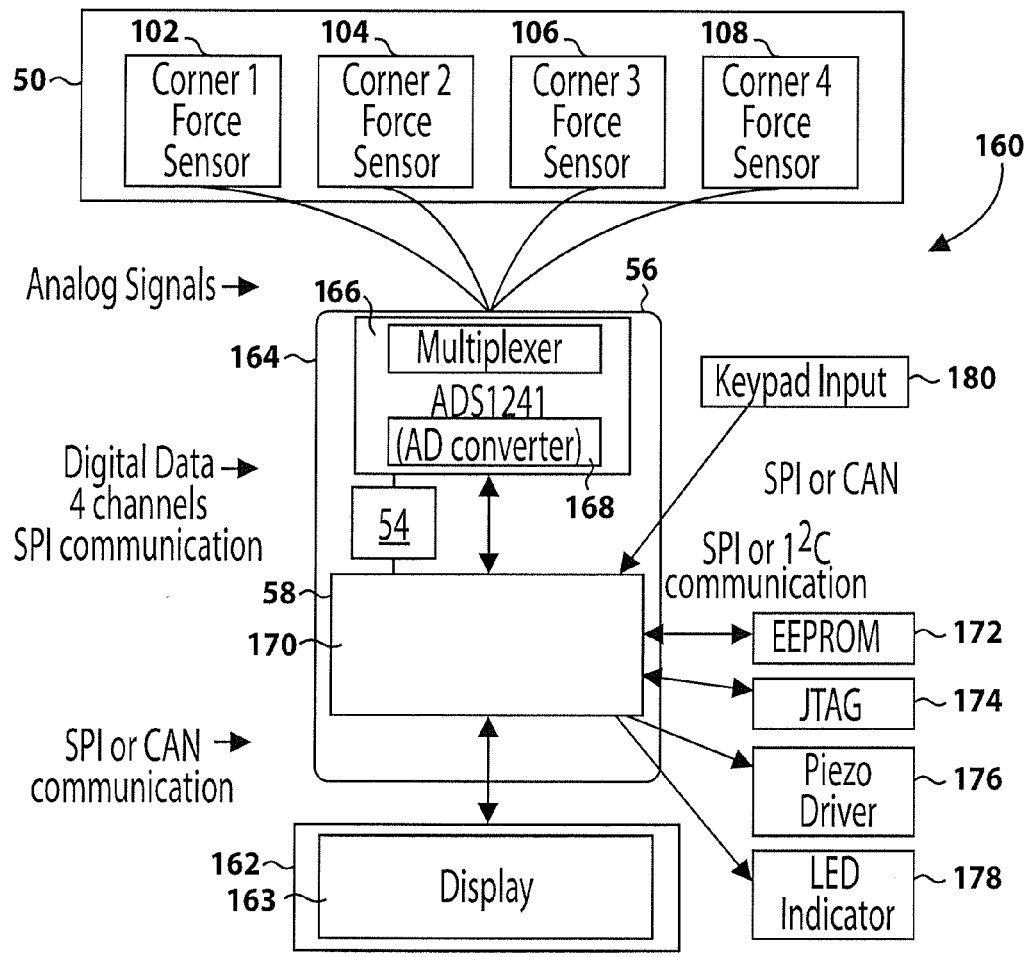
FIG. 8 is a schematic view of an exemplary control system suitable for a weight scale of the patient lift system shown in FIG. 1.
Figure 9:
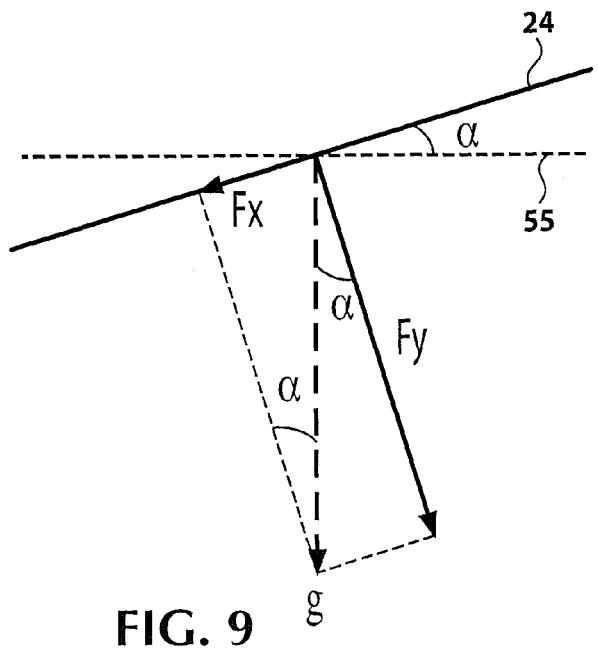
FIG. 9 illustrates an angle of inclination of a base frame of the patient lift system shown in FIG. 1 with respect to a horizontal reference plane.

An angle sensor 54, shown schematically in FIG. 8, is operatively coupled to frame assembly 22 and configured to generate a signal indicative of an angle of base frame 24 with respect to a horizontal reference plane 55 (shown schematically in FIG. 9). In one embodiment, angle sensor 54 includes an accelerometer, such as a dual-axis accelerometer. Weight scale 50 also includes a control system having a controller 56, such as a printed circuit board, coupled in signal communication with each force sensor 52 and angle sensor 54. Controller 56 includes one or more processors 58 (shown in FIG. 8) configured to receive signals from and transmit signals to each force sensor 52 and angle sensor 54 to facilitate determining the actual weight force or the actual weight of the patient. In certain embodiments, controller 56 is configured to calibrate force sensors 52 and/or angle sensor 54 to facilitate increasing the accuracy by which weight scale 50 determines the actual weight force of the patient.

Referring to FIG. 3, frame assembly 22 includes base frame 24 having a first leg 62 having a first end 64 and an opposing second end 66. First leg 62 defines a first channel 68 between first end 64 and second end 66. A second leg 72 has a first end 74 and an opposing second end 76. Second leg 72 defines a second channel 78 between first end 74 and second end 76. A cross-member 80 is coupled between first leg 62 and second leg 72. In one embodiment, foot rest panel 26 is coupled to base frame 24 at cross-member 80. Frame assembly 22 also includes a first castor support link 82 positioned within first channel 68. First castor support link 82 has a first end 84 that defines a first slot 86 and an opposing second end 88 that defines a second slot 90. Similarly, a second castor support link 92 is positioned within second channel 78. Second castor support link 92 has a first end 94 that defines a third slot 96 and an opposing second end 98 that defines a fourth slot 100.

Referring further to FIGS. 4-8, in one embodiment, a plurality of force sensors, similar to force sensor 52, are coupled to frame assembly 22. In this embodiment, a first force sensor 102 is coupled to first end 64 of first leg 62 and first end 84 of first castor support link 82, and a second force sensor 104 is coupled to second end 66 of first leg 62 and second end 86 of first castor support link 82. Similarly, a third force sensor 106 is coupled to first end 74 of second leg 72 and first end 94 of second castor support link 92, and a fourth force sensor 108 is coupled to second end 76 of second leg 72 and second end 98 of second castor support link 92. Each of first force sensor 102, second force sensor 104, third force sensor 106, and fourth force sensor 108 includes a load cell 110, such as shown in FIG. 4, coupled to the respective leg of base frame 24 and a cooperating castor support 112, such as shown in FIG. 5, operatively coupled to load cell 110, as described in greater detail below.

Figure 7:
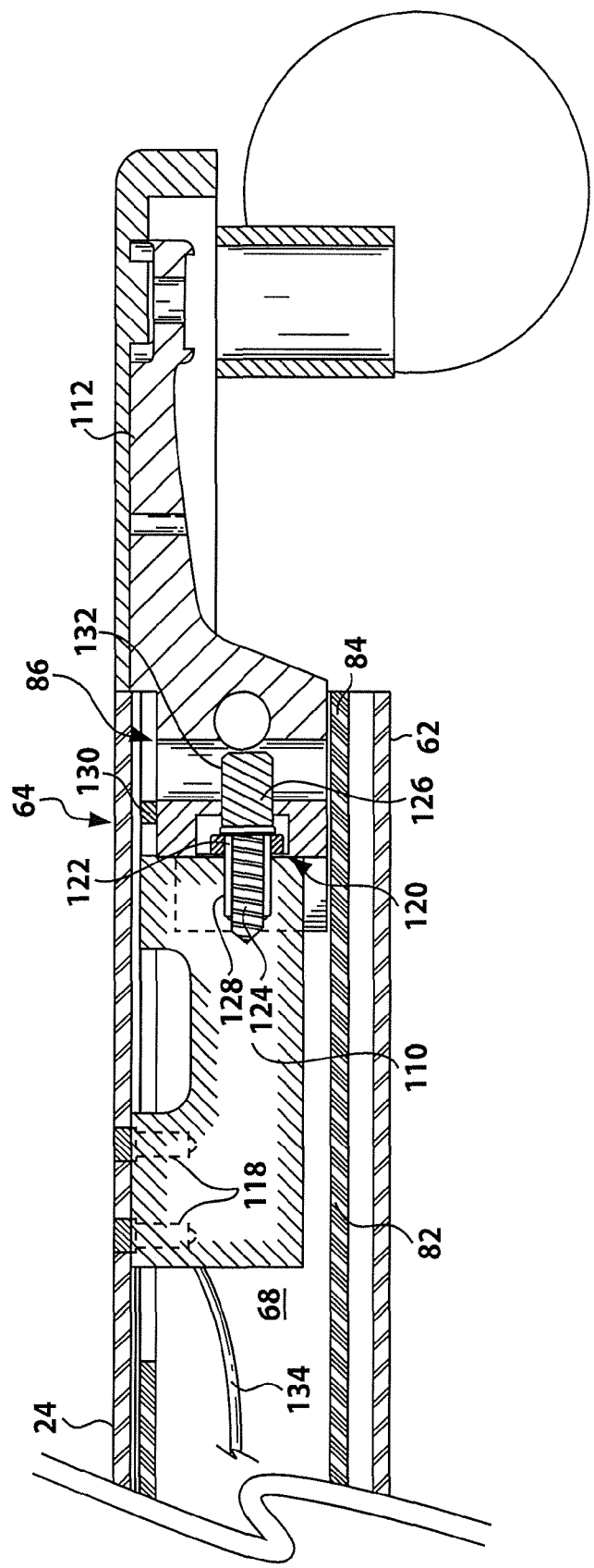
FIG. 7 is a sectional view of a portion of the frame assembly of the patient lift system shown in FIG. 2A taken along sectional line 7-7.

In one embodiment, as shown in FIG. 7, for example, load cell 110 includes a block 116 received within first channel 68 of first leg 62 of base frame 24 and positioned within first slot 86 formed at first end 84 of first castor support link 82 positioned within channel 68. Load cell 110 is coupled to first leg 62 at first end 64 using one or more suitable fasteners, such as bolts 118. A stud 120 includes a hex nut portion 122, a threaded portion 124 on one side of hex nut portion 122, and a cylindrical portion or pin 126 on the other side of hex nut portion 122. Threaded portion 124 is threaded into an aperture 128 defined within block 116 until hex nut portion 122 abuts block 116 and pin 126 extends longitudinally away from block 116. Castor support 112, as shown in FIG. 5, is received within channel 68 and coupled to first end 84 of first castor support link 82 and to first leg 62 using one or more suitable fasteners, such as bolts 130. Castor support 112 defines a bore 132 which receives pin 126 with castor support 112 coupled to first leg 62 and first castor support link 82.

Strain gauges (not shown) are included in each force sensor and are coupled to respective load cell 110. The strain gauges operate to provide an indication of the load detected by the force sensor. A known voltage is applied to input leads (not shown) coupled to the stain gauges and, as pin 126 deflects due to the application of a load, a resistance in the strain gauge changes resulting in a change in an output signal generated on output leads (not shown) coupled to the strain gauges. In one embodiment, the input lead and the output lead are bundled together in a cable 134, shown in FIG. 7, that is routed between each force sensor 102, 104, 106, 108 and controller 56, which includes signal conditioning circuitry. More specifically, when a patient steps onto foot rest panel 26, because base frame 24 is a floating frame the applied load will urge load cell 110 downward and load cell 110 will move so that pin 126 positioned within bore 132 will tend to bend. As pin 126 bends, a signal is generated by load cell 110 to indicate that a load force has been detected by the respective force sensor and the signal, including force vector data as described herein, is transmitted through cable 134 to controller 56 for processing.

Figure 6:
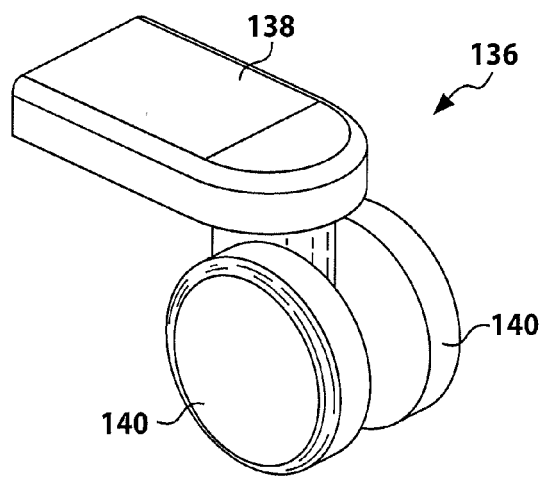
FIG. 6 is a perspective view of an exemplary castor and cover suitable for a weight scale of the patient lift system shown in FIG. 1.

A suitable castor 136, as shown in FIG. 6, is coupled to castor support 112. In a certain embodiment, a cover 138 is positionable about at least a portion of castor 136 to prevent or limit debris, such as dirt or dust, from attaching to the one or more rotatable castor wheels 140. In this embodiment, second force sensor 104 is coupled to second end 66 of first leg 62 and second end 88 of first castor support link 82, third force sensor 106 is coupled first end 74 of second leg 72 and first end 94 of second castor support link 92, and fourth force sensor 108 is coupled to second end 76 of second leg 72 and second end 98 of second castor support link 92. Each of second force sensor 104, third force sensor 106, and fourth force sensor 108 are similarly constructed as first force sensor 102 and coupled to respective portions or corners of frame assembly 22, and, as such, their assemblies are not described in detail herein.

Each force sensor 102, 104, 106, 108 is configured to output information including, without limitation, force vector data of a measured weight force to controller 56 indicative of a portion of the weight of the patient measured by each force sensor 102, 104, 106, and 108. Controller 56 utilizing one or more processors 58 is configured to generate weight information including an actual weight force based at least in part on force vector data received from force sensors 102, 104, 106, and 108. In one embodiment, controller 56 utilizing one or more processors 58 is configured to compensate for the force vector data received from force sensors 102, 104, 106, and 108 based on an angle information output, including an angle of base frame 24 with respect to horizontal reference plane 55, received from angle sensor 54 to generate the actual weight force.

More specifically, inputs from angle sensor 54 and force sensors 102, 104, 106, 108 are received by processor 58. An output from processor 58 generates weight output information. Angle sensor 54 measures the inclination angle of base frame 24 and outputs a signal corresponding to the angle to processor 58. Weight scale 50 measures the weight of patient lift system 20 and the patient and outputs a corresponding signal to processor 58. Processor 58 uses input signals from angle sensor 54 and each force sensor 102, 104, 106, 108 to compensate for error introduced in the weight scale reading when base frame 24 is inclined at an angle as described herein. Processor 58 outputs the corrected patient weight to a suitable display.

As shown in FIG. 8, a control system 160 for controlling operation of patient lift system 20 includes controller 56 in operational control communication with weight scale 50. As described above, controller 56 is coupled in signal communication with each force sensor 102, 104, 106, and 108 and angle sensor 54. Controller 56 includes one or more processors 58 configured to receive analog signals from each force sensor 102, 104, 106, and 108 and angle sensor, convert the analog signals to digital signals, and transmit the digital signals to a central processing unit (CPU) of controller 56 for processing the digital data to facilitate determining an actual weight force of the patient and output weight information including the actual weight force to a patient input device 162 coupled in signal communication with controller 56.

Patient input device 162 includes a display 163 configured to display information received by patient input device 162 from controller 56 and/or one or more processors 58. In one embodiment, patient input device 162 is configured to receive, from the user (e.g., the manufacturer, a caregiver, or a patient), a selection of content to be stored on control system 160, and may include one or more of the following: display 163, a touch screen, a speaker, and a user input selection device. The user may select a font type, font color, font size, and volume, as well as what notifications, messages, programs, applications, and data to present and be available to the user on patient input device 162.

Load cells 110 associated with each force sensor 102, 104, 106, and 108 generate separate analog signals that are input to a printed circuit board 164. More specifically, electrical signals continuously generated by each force sensor 102, 104, 106, and 108 are transmitted to and received by a multiplexer 166 including an analog-to-digital (A/D) converter 168. In one embodiment, one or more amplifiers (not shown) couple each force sensor 102, 104, 106, and 108 to A/D converter 168. At A/D converter 168, the analog signals received from force sensors 102, 104, 106, and 108 are converted to respective digital signals or ADC values and transmitted to a computer or CPU, such as an ARM Cortex-M processor, shown generally at 170 using a serial interface communication protocol, such as a serial peripheral interface bus (SPI), or other suitable communication protocol, for processing.

CPU 170 is connected to various accessories including, without limitation, memory areas, such as an EEPROM 172 configured to store calibration data including results of various calibrations to weight scale 50. In one embodiment, EEPROM 172 is coupled in serial interface communication with CPU 170, such as by a serial peripheral interface bus (SPI) or an inter-integrated circuit interface (I²C) protocol. A joint test action group (JTAG) 174 utilized to debug the controller instructions and download instructions to CPU 170, a piezo driver 176, and a LED indicator 178 are also coupled in serial interface communication with CPU 170, such as by SPI or I²C protocol. An input device 180, such as a keyboard, is used to input calibration information. Patient input device 162 and display 163 provide a visual display of data and instructions for inputting calibration data.

Although CPU 170 and processors 58 are shown separate from the memory area including EEPROM 172, embodiments of the disclosure contemplate that the memory area may be onboard CPU 170 and/or processors 58 such as in some embedded systems. Further, patient input device 162 and display 163 provide presentation capabilities related to, for example, text, images, audio, video, graphics, alerts, and the like. Patient input device 162 and display 163 present information ranging from low-resolution to high-resolution multimedia related not only to operation and functionality of patient lift system 20 and weight scale 50, but also to a connectivity status and functionality related to other electronic components of patient lift system 20. Data connectivity capabilities of control system 160 allow for an exchange of data between these components. Additionally, the data connection capability allows control system 160 to be connected to other sources of data and media such as a laptop, a desktop, a Motion Pictures Experts Group-1 Audio Layer 3 (MP3) player, a Motion Pictures Experts Group-4 Part 14 (MP4) player, gaming systems, or other media storage devices.

FIG. 8 is merely illustrative of an exemplary control system 160 that can be used in connection with one or more embodiments of the disclosure, and is not intended to be limiting in any way. Further, peripherals or components of control system 160 known in the art may not be shown, but are operable with aspects of the disclosure. For example, a speaker, a printing component, and the like are contemplated.

The memory areas or other computer-readable media, store computer-executable components. For example, the memory areas store computer-executable components for receiving data from the user, controlling patient lift system 20 and weight scale 50 based on the received data, and transmitting messages and/or notifications between controller 56 and patient input device 162.

In one embodiment, force sensors 102, 104, 106, 108 and/or angle sensor 54 are calibrated to facilitate accurately measuring an actual weight force g, that is, an actual weight of the patient, when an angle of inclination of base frame 24 is non-horizontal.

When a patient (not shown in FIG. 1) rests his or her feet on foot rest panel 26, the patient's mass is accelerated by gravity to produce a weight force g directed in a vertical, downward direction. Referring to FIG. 9, when foot rest panel 26 and base frame 24 are aligned in a non-parallel or non-horizontal orientation relative to horizontal reference plane 55, as set during initial calibration of weight scale 50, the weight force g is conceivable as a sum of component vector forces including a force vector $F_y$ perpendicular to base frame 24 and a second force vector $F_x$ parallel to base frame 24. It should be appreciated, then, that force vector $F_y$ has a first magnitude directed at a force angle α relative to the direction of the weight force g and force vector $F_x$ has a second magnitude that is directed perpendicular to the direction of force vector $F_y$. To this end, it should be readily appreciated that force angle α is a complement of the angle between vertical and a plane of base frame 24.

Force sensors, such as load cells, typically measure only forces which are applied perpendicularly to base frame 24, such as force vector $F_y$. Therefore, when a load cell or any other suitable force sensor is positioned to measure and indicate the force vector $F_y$ as the weight of the patient, the measured weight of the patient is inaccurate when base frame 24 is in a non-horizontal position because the weight force g is not perpendicular to the force sensor. However, FIG. 9 shows that:

$$\sin α = F_x/g \quad [\text{Eq. 1}]$$

and $$\cos α = F_y/g. \quad [\text{Eq. 2}]$$

Therefore, $$α = A \sin(F_x/g). \quad [\text{Eq. 3}]$$

Further, from FIG. 9, it follows that:

$$g = F_y/\cos α. \quad [\text{Eq. 4}]$$

As a result, a measurement of the force angle α (and a determination of the sine of the force angle α) is used to compensate for a measurement of the force $F_x$, for example, in order to arrive at an actual weight force g, that is, an actual weight of the patient, when an angle of inclination of base frame 24 is non-horizontal.

As described herein, one or more angle sensors 54 are operatively coupled to base frame 24 to measure and output a signal indicative of the angle of base frame 24 with respect to horizontal reference plane 55. In one embodiment, angle sensor 54 includes an accelerometer, such as a dual-axis accelerometer, although other angles sensors may be used. In one embodiment, angle sensor 54 is mounted to printed circuit board 164 of controller 56, which is parallel to an X-Y surface of angle sensor 54. Further, printed circuit board 164 is installed on patient lift system 20 such that printed circuit board 164 is parallel to base frame 24. As a result, the angle α as detected by angle sensor 54 is equal to an angle of inclination of base frame 24, e.g., the angle of base frame 24 with respect to horizontal reference plane 55 about a transverse axis. As described below, controller 56 uses output signals from angle sensor 54 to compensate for weighing errors created when base frame 24 is aligned at a non-horizontal angle with respect to horizontal reference plane 55.

Figure 10:
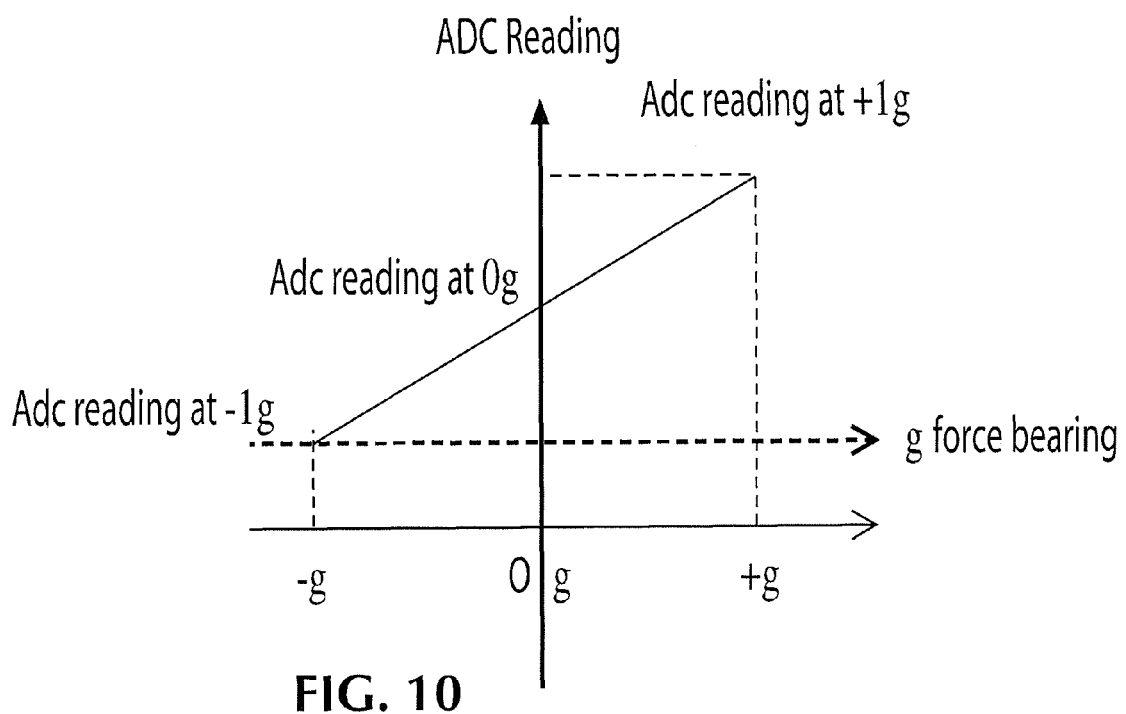
FIG. 10 illustrates an exemplary method for calibrating an angle sensor of a weight scale of the patient lift system shown in FIG. 1.

Further, referring to FIG. 10, one or more processors 58 of controller 56 are configured to calibrate angle sensor 54 based on a determination of a plurality of calibration factors, including an X direction ADC value per g (XADCperg), an X direction ADC value when g is zero (XADCat0g), a Y direction ADC value per g (YADCperg), and a Y direction ADC value when g is zero (YADCat0g), as transmitted by A/D converter 168 to CPU 170. When α is 0 degrees, $F_x$=0 g, and no force is detected. This reading represents 0 g force. When α is 90 degrees, $F_x$=+1 g. This reading represents a Maximum Reading. When α is 270 degrees, $F_x$=−1 g. This reading represents a Minimum Reading.

During calibration of angle sensor 54, printed circuit board 164 is rotated within the X-Y plane between an angle of 0° and 360°. At one point during the rotation, angle sensor 54 experiences a maximum value (Maximum Reading), that is (g*k), and at a second point during the rotation angle sensor 54 experiences a minimum value (Minimum Reading), that is (−g*k), resulting in the following equations:

$$\text{Maximum Reading} = g*k+b, \quad [\text{Eq. 5}]$$

and $$\text{Minimum Reading} = -g*k+b, \quad [\text{Eq. 6}]$$

wherein k=ADC/g (ADCperg) and b=ADC value or reading when the force experienced on force sensor 54 is zero, that is the ADC value or reading at zero g point (ADCat0g).

From detection of the Maximum Reading and the Minimum Reading, ADCperg and ADCat0g can be calculated as follows:

$$k = (\text{Maximum Reading} - \text{Minimum Reading})/2g = \\ ((\text{Maximum Reading} - \text{Minimum Reading})/2)/ \\ g = \text{ADCperg} \quad [\text{Eq. 7}]$$

and $$b=(\text{Maximum Reading}+\text{Minimum Reading})/2=\text{ADCat0}g. \quad [\text{Eq. 8}]$$

Assuming that a current Reading is ADC_Reading, the angle α of inclination of base frame 24, e.g., the angle of base frame 24 with respect to horizontal reference plane 55 about a transverse axis, is as follows:

$$\alpha=a\sin((\text{ADC\_Reading}-\text{XADCat0}g)/\text{XADCperg})*180/\pi. \quad [\text{Eq. 9}]$$

In one embodiment, the angle of base frame 24 with respect to horizontal reference plane 55 is based on X and Y direction ADC values and the plurality of calibration factors. Once a mounting offset of foot rest panel 26 with respect to base frame 24 is determined, and the force vector data received from each force sensor 102, 104, 106, and 108 is compensated for, an actual weight force of the patient, g, can be determined.

In one embodiment, controller 56 is configured to receive an altitude value and a latitude value inputted by the patient using patient input device 162 coupled in signal communication with controller 56. Patient input device 162 is configured to display on display 163 information including, without limitation, a system status, weight information, foot rest panel angle information. Patient input device 162 is also configured to receive patient instructions utilizing a graphical user interface or display 163, for example.

More specifically, a local or factory gravity constant (G_Loc) and a shipment destination gravity constant (G_Dest) can be retrieved from memory EEPROM 172 of controller 56 based on the altitude value and the latitude value inputted by the patient using patient input device 162. Typically, patient lift system 20 is calibrated at the factory without knowledge of the shipment destination. However, with a manufacturing location altitude value (Local_Alt) and a manufacturing location latitude value (Local_Lat) and a shipment destination altitude value (Dest_Alt) and a shipment destination latitude value (Dest_Lat), a gravity factor (G_Factor) can be calculated as follows:

$$G\_Loc=9.780318*(1+(0.0053024*(\sin(Loc\_Lat*3.1415927/180)*\sin(Loc\_Lat*3.1415927/180))-(0.0000058*(\sin(2*Loc\_Lat*3.1415927/180)*\sin(2*Loc\_Lat*3.1415927/180))))-(0.000003085*Loc\_Alt), \quad [\text{Eq. 10}]$$

$$G\_Dest=9.780318*(1+(0.0053024*(\sin(Dest\_Lat*3.1415927/180)*\sin(Dest\_Lat*3.1415927/180))-(0.0000058*(\sin(2*Dest\_Lat*3.1415927/180)*\sin(2*Dest\_Lat*3.1415927/180)))-(0.000003085*Dest\_Alt), \quad [\text{Eq. 11}]$$

and $$G\_Factor=G\_Loc/G\_Dest. \quad [\text{Eq. 12}]$$

From Equations [Eq. 10]-[Eq. 12], an actual weight of the patient at the destination (ActualWeight_Dest) can be calculated as follow:

$$\text{ActualWeight\_Dest}=\text{Weight at Destination}*G\_Factor. \quad [\text{Eq. 13}]$$

In one embodiment, one or more processors 58 are further configured to determine the angle of foot rest panel 26 with respect to frame assembly 22 based on X and Y direction ADC values and the plurality of calibration factors, determine a mounting offset of foot rest panel 26, and compensate for force vector data received from each force sensor 102, 104, 106, and 108 to determine an actual weight force of the patient.

Figure 11:
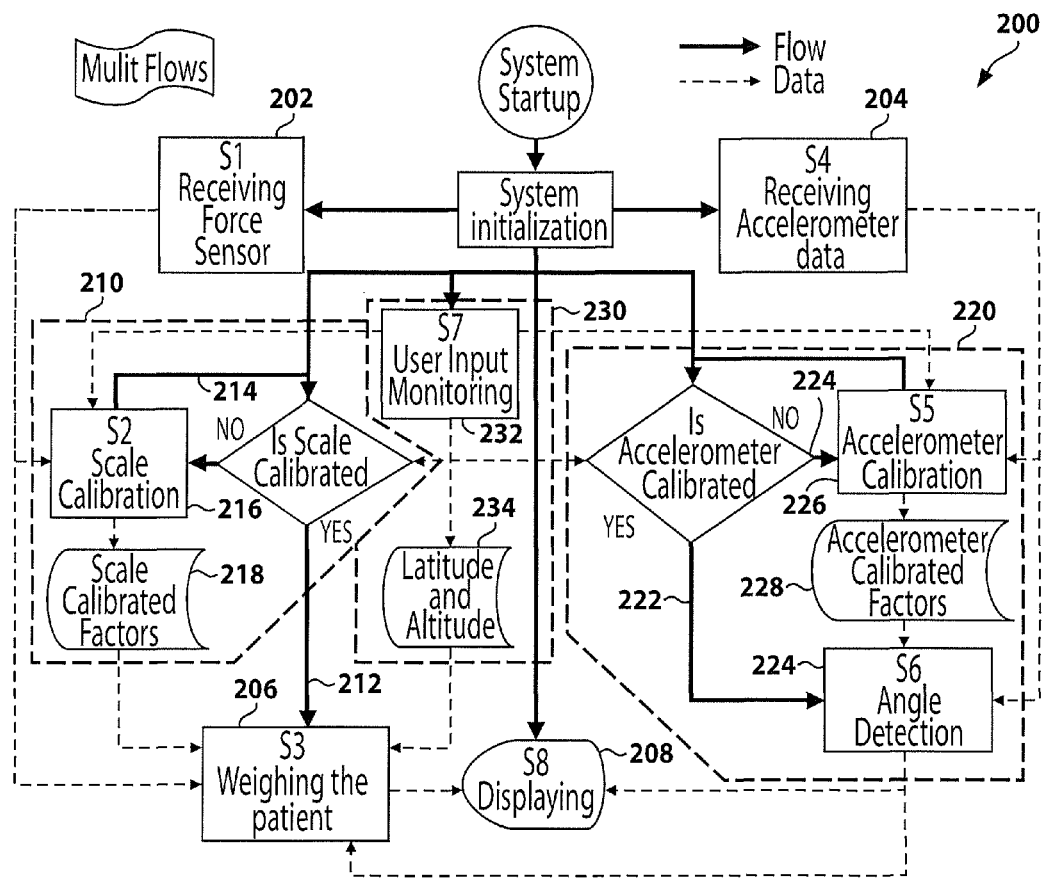
FIG. 11 illustrates an exemplary method for weighing a patient supported on the patient lift system shown in FIG. 1.

In one embodiment, a method 200 for weighing a patient supported on patient lift system 20 using weight scale 50 is illustrated in FIG. 11. When patient lift system is first installed, weight scale 50 is calibrated and control system 160 is initialized 202. In this embodiment, weight scale 50 is calibrated as follows.

A total weight equals the sum of the weights read by the four force sensors. The basic equation for each force sensor is:

$$y[i]=g[i](x-h[i]) \quad [\text{Eq. 14}]$$

where y=patient weight, x=the A/D converter output, g[i] and h[i] are constants, x is a sensed value proportional to the total weight sensed by the load cell, h[i] is the sensed value corresponding to the weight of the patient lift system without a patient, and g[i] is a constant to convert the digital signal into a weight unit of measure, such as pounds.

Initially, then, four equations are formed by removing all patient loading. The four equations are:

$$0=g[1](x[0,1]-h[1]) \quad [\text{Eq. 15}]$$

$$0=g[2](x[0,2]-h[2]) \quad [\text{Eq. 16}]$$

$$0=g[3](x[0,3]-h[3]) \quad [\text{Eq. 17}]$$

$$0=g[4](x[0,4]-h[4]) \quad [\text{Eq. 18}]$$

These equations reduce to:

$$h[1]=x[0,1] \quad [\text{Eq. 19}]$$

$$h[2]=x[0,2] \quad [\text{Eq. 20}]$$

$$h[3]=x[0,3] \quad [\text{Eq. 21}]$$

$$h[4]=x[0,4] \quad [\text{Eq. 22}]$$

With a standard weight applied to the four locations, four more equations are derived based on the equation for total sensed loading (patient) weight:

$$y=y[1]+y[2]+y[3]+y[4] \quad [\text{Eq. 23}]$$

The four resulting equations are:

$$y=\Sigma g[i](x[1,i]-h[i]) \quad [\text{Eq. 24}]$$

$$y=\Sigma g[i](x[2,i]-h[i]) \quad [\text{Eq. 25}]$$

$$y=\Sigma g[i](x[3,i]-h[i]) \quad [\text{Eq. 26}]$$

$$y=\Sigma g[i](x[4,i]-h[i]) \quad [\text{Eq. 27}]$$

where x[j, i] for j, i=1, 2, 3, 4 are the respective A/D converter readings or ADC values and y is the standard weight. Using a standard Gauss-Jordan or other appropriate elimination method, Equations [19]-[22] and [24]-[27] are solved to obtain values for g[1], g[2], g[3], g[4], h[1], h[2], h[3], and h[4].

When the patient is initially put on patient lift system 20, the patient's weight is measured and set equal to $y_0$. Thereafter, the dynamic weight of the patient, y, is measured.

Referring further to FIG. 11, after system start up and control system initialization 202, one or more processors 58 receive 204 force vector data from force sensors 102, 104, 106, 108 operatively coupled to frame assembly 22 of patient lift system 20. Further, one or more processors 58 receive 206 angle information from angle sensor 54 operatively coupled to frame assembly 22. As the patient is weighed 206, one or more processors 58 compensate for the force vector data based on the angle information to determine an actual weight force of the patient. The actual weight force of the patient is displayed 208 on display 163 of patient input device 162 coupled in signal communication with controller 56.

In one embodiment, weight scale 50 may be calibrated 210, including calibration of force sensors 102, 104, 106, 108 before the patient is weighed. If weight scale 50 was recently calibrated 212, the patient is weighed 206. If weight scale 50 has not been recently calibrated 214, weight scale 50 is calibrated 216, as described above, using force vector data received by one or more processors 58 from each force sensor 102, 104, 106, 108 and/or suitable calibration factors received 218 by one or more processors 58 from EEPROM 172.

Additionally, angle sensor 54 may be calibrated 220 before the patient is weighed. If angle sensor 54 was recently calibrated 222, an angle of base frame 24 with respect to horizontal reference plane 55 is detected 224 by one or more processors 58 using data received from angle sensor 54, and the patient is weighed 206. If angle sensor 54 has not been recently calibrated 224, angle sensor 54 is calibrated 226, as described above, using angle data or information received by one or more processors 58 from angle sensor 54 and/or suitable calibration factors received 228 by one or more processors 58 from EEPROM 172 to detect the angle of base frame 24 with respect to horizontal reference plane 55.

In one embodiment, information is received 230 by one or more processors 58 to facilitate accurately determining an actual weight force of the patient. For example, information inputted 232 by the patient into patient input device 162 is received by one or more processors 58 and utilized to calibrate weight scale 50. In one embodiment, the patient or caregiver inputs 234 information including a shipment destination altitude value (Dest_Alt) and a shipment destination latitude value (Dest_Lat) to facilitate determining a gravity factor (G_Factor) to facilitate accurately determining an actual weight force of the patient 28 when weighing 206 the patient.

In one embodiment, weight scale 50 includes a non-transitory computer-readable medium having computer-executable instructions stored thereon for execution by one or more processors to perform the method for weighing a patient supported on a patient lift system weight scale.

The described system and methods are not limited to the specific embodiments described herein. In addition, components of each system and/or steps of each method may be practiced independent and separate from other components and method steps, respectively, described herein. Each component and method also can be used in combination with other systems and methods.

By way of example and not limitation, an exemplary operating environment includes computer readable media including computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the disclosure are operational with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when configured to execute the instructions described herein.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A weight scale for a patient lift system, the weight scale comprising:
   a frame assembly;
   a plurality of force sensors coupled to the frame assembly, each force sensor of the plurality of force sensors configured to generate a signal indicative of a measured weight force;
   a base frame of the frame assembly comprising a first leg having a first end and an opposing second end, the first leg defining a first channel between the first end and the second end and a second leg having a first end and an opposing second end, the second leg defining a second channel between the first end and the second end of the second leg;
   a first castor support link positioned within the first channel, the first castor support link having a first end defining a first slot and an opposing second end defining a second slot;

a first force sensor of the plurality of force sensors positioned within the first slot and coupled to the first leg at the first leg first end;

a second force sensor of the plurality of force sensors positioned within the second slot and coupled to the first leg at the first leg second end;

a second castor support link positioned within the second channel, the second castor support link having a first end defining a third slot and an opposing second end defining a fourth slot;

a third force sensor of the plurality of force sensors positioned within the third slot and coupled to the second leg at the second leg first end;

a fourth force sensor of the plurality of force sensors positioned within the fourth slot and coupled to the second leg at the second leg second end;

a foot rest panel coupled to the frame assembly, the foot rest panel configured to support a patient;

an angle sensor operatively coupled to the frame assembly, the angle sensor configured to generate a signal indicative of an angle of the frame assembly with respect to a horizontal reference plane; and a controller coupled in signal communication with each force sensor and the angle sensor, the controller comprising one or more processors configured to receive signals from each force sensor and the angle sensor to determine an actual weight force of the patient.

2. The weight scale of claim 1, wherein the first force sensor comprises:

a load cell, the load cell comprising a pin; and a castor support coupled to the first leg first end and the castor support link first end, the castor support defining a bore configured to receive the pin with the castor support coupled to the first leg.

3. The weight scale of claim 2, further comprising a castor coupled to the castor support.

4. The weight scale of claim 1, wherein each force sensor is configured to output force vector information including the measured weight force to the controller indicative of a portion of the actual weight force of the patient measured by each force sensor.

5. The weight scale of claim 4, wherein the controller is configured to generate weight information including the actual weight force based at least in part on force vector information received from each force sensor.

6. The weight scale of claim 5, wherein the controller is configured to compensate for the force vector information received from each force sensor based on an angle information output received from the angle sensor to generate the actual weight force.

7. The weight scale of claim 1, further comprising a patient input device in signal communication with the controller, the patient input device comprising a display configured to display information received from the controller.

8. The weight scale of claim 1, wherein the controller is configured to calibrate the plurality of force sensors.

9. The weight scale of claim 1, wherein the controller is configured to calibrate the angle sensor.

10. The weight scale of claim 1, wherein each force sensor comprises a load cell and a castor support operatively coupled to the load cell.

11. The weight scale of claim 1, wherein the angle sensor comprises an accelerometer.

12. A control system for a patient lift system comprising a frame assembly, a foot rest panel coupled to the frame assembly, the foot rest panel configured to support a patient, and a weight scale comprising a plurality of force sensors coupled to the frame assembly and an angle sensor operatively coupled to the frame assembly, the control system comprising:

a controller coupled in signal communication with each force sensor of a plurality of force sensors and the angle sensor, the controller comprising one or more processors configured to receive signals from each force sensor and the angle sensor to determine an actual weight force of the patient and output weight information including the actual weight force to a display;

a base frame of the frame assembly comprising a first leg having a first end and an opposing second end, the first leg defining a first channel between the first end and the second end and a second leg having a first end and an opposing second end, the second leg defining a second channel between the first end and the second end of the second leg;

a first castor support link positioned within the first channel, the first castor support link having a first end defining a first slot and an opposing second end defining a second slot;

a first force sensor of the plurality of force sensors positioned within the first slot and coupled to the first leg at the first leg first end;

a second force sensor of the plurality of force sensors positioned within the second slot and coupled to the first leg at the first leg second end;

a second castor support link positioned within the second channel, the second castor support link having a first end defining a third slot and an opposing second end defining a fourth slot;

a third force sensor of the plurality of force sensors positioned within the third slot and coupled to the second leg at the second leg first end; and a fourth force sensor of the plurality of force sensors positioned within the fourth slot and coupled to the second leg at the second leg second end.

13. The control system of claim 12, wherein the one or more processors are further configured to receive force vector data from each force sensor and calibrate the weight scale based on the received force vector data, wherein the force vector data includes an individual weighing factor attributed to a weight distribution of the patient lift system.

14. The control system of claim 12, wherein the one or more processors are configured to apply a Gauss-Jordan elimination method to calibrate the weight scale.

15. The control system of claim 12, wherein the one or more processors are configured to determine a foot rest panel mounting offset.

16. The control system of claim 12, wherein the one or more processors are configured to determine a weight of the patient lift system and the actual weight force of the patient based on one or more of the following: force vector data received from each force sensor, associated weighing factors for each force sensor, a gravity factor determined from a latitude and an altitude at a destination location, a foot rest panel mounting offset, and angle information received from the angle sensor.

17. The control system of claim 12, wherein the one or more processors are configured to receive directional data from the angle sensor to calibrate the angle sensor and determine an angle of the frame assembly with respect to a horizontal reference plane.

18. The control system of claim 12, wherein the one or more processors are configured to calibrate the angle sensor based on a determination of a plurality of calibration factors including an X direction ADC value per g, an X direction ADC value when g is zero, a Y direction ADC value per g, and a Y direction ADC value when g is zero.

19. The control system of claim 18, wherein the one or more processors are further configured to:
  determine the angle of the frame assembly with respect to the horizontal reference plane based on the plurality of calibration factors;
  determine a mounting offset of the foot rest panel; and
  compensate for force vector data received from each force sensor to determine an actual weight force of the patient.

20. The control system of claim 12, wherein the one or more processors are further configured to receive an altitude value and a latitude value inputted by the patient using a patient input device coupled in signal communication with the controller.

21. The control system of claim 20, wherein the patient input device comprises a display configured to display information including one or more of the following: a system status, patient weight information, and foot rest panel angle information.

22. The control system of claim 20, wherein the patient input device is configured to receive patient instructions.

23. A method for weighing a patient supported on a patient lift system, the patient lift system including a controller comprising one or more processors operable to execute computer-executable instructions, said method comprising:
  providing a weight scale of the patient lift system comprising:
    a base frame of a frame assembly comprising a first leg having a first end and an opposing second end, the first leg defining a first channel between the first end and the second end and a second leg having a first end and an opposing second end, the second leg defining a second channel between the first end and the second end of the second leg;
    a first castor support link positioned within the first channel, the first castor support link having a first end defining a first slot and an opposing second end defining a second slot;
    a first force sensor of a plurality of force sensors positioned within the first slot and coupled to the first leg at the first leg first end;
    a second force sensor of the plurality of force sensors positioned within the second slot and coupled to the first leg at the first leg second end;
    a second castor support link positioned with the second channel, the second castor support link having a first end defining a third slot and an opposing second end defining a fourth slot;
    a third force sensor of the plurality of force sensors positioned within the third slot and coupled to the second leg at the second leg first end; and
    a fourth force sensor of the plurality of force sensors positioned within the fourth slot and coupled to the second leg at the second leg second end;
  receiving, by the one or more processors, force vector data from a the force sensors operatively coupled to the frame assembly of the patient lift system;
  receiving, by the one or more processors, angle information from an angle sensor operatively coupled to the frame assembly;
  compensating, by the one or more processors, for the force vector data based on the angle information;
  determining, by the one or more processors, an actual weight force of the patient; and
  displaying the actual weight force of the patient on a display coupled in signal communication with the controller.

24. The method of claim 23, further comprising calibrating, by the one or more processors, the plurality of force sensors.

25. The method of claim 23, further comprising calibrating, by the one or more processors, the angle sensor.

26. The method of claim 23, further comprising determining, by the one or more processors, a local gravity constant.

27. The method of claim 23, further comprising initializing, by the one or more processors, the controller.

28. The method of claim 23, further comprising receiving, by the one or more processors, information input by the patient to facilitate determining an actual weight force of the patient.

29. A non-transitory computer-readable medium having computer-executable instructions stored thereon for execution by one or more processors to perform a method for weighing a patient supported on a patient lift system weight scale, said method comprising:
  receiving from a plurality of force sensors force vector data;
  receiving, from an angle sensor operatively coupled to a frame assembly of the patient lift system, information indicative of an angle of the frame assembly with respect to a horizontal reference plane;
  compensating for the force vector data based on the information; and
  determining an actual weight force of the patient,
  wherein the patient lift system weight scale comprises:
    a base frame of the frame assembly comprising a first leg having a first end and an opposing second end, the first leg defining a first channel between the first end and the second end and a second leg having a first end and an opposing second end, the second leg defining a second channel between the first end and the second end of the second leg;
    a first castor support link positioned within the first channel, the first castor support link having a first end defining a first slot and an opposing second end defining a second slot;
    a first force sensor of the plurality of force sensors positioned within the first slot and coupled to the first leg at the first leg first end;
    a second force sensor of the plurality of force sensors positioned within the second slot and coupled to the first leg at the first leg second end;
    a second castor support link positioned within the second channel, the second castor support link having a first end defining a third slot and an opposing second end defining a fourth slot;
    a third force sensor of the plurality of force sensors positioned within the third slot and coupled to the second leg at the second leg first end; and
    a fourth force sensor of the plurality of force sensors positioned within the fourth slot and coupled to the second leg at the second leg second end.

30. A weight scale for a patient lift system comprising a base frame and a foot rest panel coupled to the base frame, the foot rest panel configured to support a patient, the weight scale comprising:
  a plurality of force sensors coupled to the base frame, each force sensor of the plurality of force sensors configured to generate a signal indicative of a measured weight force, wherein the base frame comprises a first leg having a first end and an opposing second end, the first leg defining a first channel between the first end and the second end and a second leg having a first end and an opposing second end, the second leg defining a second channel between the first end and the second end of the second leg;

a first castor support link positioned within the first channel, the first castor support link having a first end defining a first slot and an opposing second end defining a second slot;

a first force sensor of the plurality of force sensors positioned within the first slot and coupled to the first leg at the first leg first end;

a second force sensor of the plurality of force sensors positioned within the second slot and coupled to the first leg at the first leg second end;

a second castor support link positioned within the second channel, the second castor support link having a first end defining a third slot and an opposing second end defining a fourth slot;

a third force sensor of the plurality of force sensors positioned within the third slot and coupled to the second leg at the second leg first end;

a fourth force sensor of the plurality of force sensors positioned within the fourth slot and coupled to the second leg at the second leg second end;

an angle sensor operatively coupled to the base frame, the angle sensor configured to generate a signal indicative of an angle of the base frame with respect to a horizontal reference plane; and a controller coupled in signal communication with each force sensor and the angle sensor, the controller comprising one or more processors configured to receive signals from each force sensor and the angle sensor to determine an actual weight force of the patient.

31. The weight scale of claim 30, wherein the base frame includes a first leg having a first end and an opposing second end, the first leg defining a first channel between the first end and the second end, and a second leg having a first end and an opposing second end, the second leg defining a second channel between the first end and the second end of the second leg, the weight scale further comprising:

a first castor support link positioned within the first channel, the first castor support link having a first end defining a first slot and an opposing second end defining a second slot;

a first force sensor of the plurality of force sensors positioned within the first slot and coupled to the first leg at the first leg first end; and a second force sensor of the plurality of force sensors positioned within the second slot and coupled to the first leg at the first leg second end.

32. The weight scale of claim 31, wherein the first force sensor comprises:

a load cell, the load cell comprising a pin; and a castor support coupled to the first leg first end and the castor support link first end, the castor support defining a bore configured to receive the pin with the castor support coupled to the first leg.

33. The weight scale of claim 32, further comprising a castor coupled to the castor support.

34. The weight scale of claim 31, further comprising:

a second castor support link positioned within the second channel, the second castor support link having a first end defining a third slot and an opposing second end defining a fourth slot;

a third force sensor of the plurality of force sensors positioned within the third slot and coupled to the second leg at the second leg first end; and a fourth force sensor of the plurality of force sensors positioned within the fourth slot and coupled to the second leg at the second leg second end.

* * * * *